UNITED STATES PATENT OFFICE.

THEODOR MEYER, OF BUERGEL, GERMANY, ASSIGNOR TO FIRM OF K. OEHLER, ANILIN- & ANILINFARBEN- FABRIK, OF OFFENBACH-ON-THE-MAIN, GERMANY.

METHOD OF MAKING HYDROGEN CHLORID AND SODIUM SULFATE.

SPECIFICATION forming part of Letters Patent No. 702,877, dated June 17, 1902.

Application filed February 12, 1902. Serial No. 93,778. (No specimens.)

*To all whom it may concern:*

Be it known that I, THEODOR MEYER, doctor of philosophy, chemist, residing at Offenbacherstrasse 114, Buergel, near Offenbach-on-the-Main, Germany, have invented new and useful Improvements in the Manufacture of Sodium Sulfate and Hydrogen Chlorid, of which the following is a specification.

This invention relates to the manufacture of hydrogen chlorid and sodium sulfate (Glauber salt) by heating together common salt and sodium bisulfate. In such manufacture as heretofore practiced the materials have been simply crushed, and in that state they have been heated together to very high temperatures, commonly to a good red heat and sometimes to the fusing-point, in a furnace in which they were mechanically agitated or were stirred by hand through an open door.

The present improvement is based upon the discovery which I have made that when an intimate mixture of chemically-proper proportions—that is to say, equimolecular proportions—of common salt and bisulfate, both most finely powdered, is heated in a closed retort to about 400° centigrade only the hydrogen chlorid is completely developed in the short time of about forty minutes after the charging of the vessel without any stirring and the sulfate obtained is of a faultless (chemical and physical) prime quality. In carrying out my invention I grind the salts so fine as to pass a sieve of four hundred meshes to the square centimeter and instead of a reverberatory furnace or a large fire-brick muffle, in which the salt masses are moved and stirred by hand or mechanically at a temperature of 800° to 900° centigrade and where but diluted gases are obtained, I use a simple small retort closed air-tight, containing from two hundred to three hundred kilograms of the mixture at a temperature of about 400° centigrade only, and I get a pure gas of nearly one hundred per cent. real HCl.

In my process a partial fluxing does not take place, for any particle of bisulfate being about to flux will immediately be converted into neutral sulfate by a neighboring particle of common salt. Thus the mass does not adhere to the sides of the retort, but slags to a crumbly sulfate of best quality. The temperature being very moderate and regular, the evolved hydrogen chlorid is also nearly free from sulfuric acid and may be easily and completely condensed by water to a hydrochloric acid of highest concentration, as long as care is taken to keep down the temperature. By proper management of the apparatus in this proceeding an escaping of hydrochloric-acid vapors is quite out of question. Though not necessary, it is, however, advisable to move the acid gases forward by slight suction through a fan-blast attached at the end of a condenser. The hydrogen chlorid does not contain any impurities except a small percentage of water, and may instead of being transformed into hydrochloric acid by water absorption be condensed by pressure and cooling to a liquid state after having been dried by concentrated sulfuric acid or the like.

I do not limit myself to the quantity of two hundred to three hundred kilograms nor to the temperature of 400° centigrade. If I go down to, say, 350° centigrade, the reaction will take place; but a far longer time will be necessary to complete the conversion. If I raise the temperature over 400° centigrade, the reaction will be completed in a shorter time than forty minutes; but care must be taken that the temperature should not be allowed to rise to the melting-point.

What I claim as my invention is—

1. The within-described improvement in the process of manufacturing concentrated hydrogen chlorid and sodium sulfate which consists in finely powdering and intimately mixing in about equimolecular proportions common salt and sodium bisulfate and heating the same to a temperature below the melting-point.

2. The within-described improvement in the process of manufacturing hydrogen chlorid and sodium sulfate which consists in finely powdering and intimately mixing in about equimolecular proportions common salt and sodium bisulfate and heating the mixture in a closed vessel to a temperature of about 400° centigrade.

In testimony whereof I have signed my name to this specification in the presence of two subscribing witnesses.

THEODOR MEYER.

Witnesses:
HERMANN WEST,
ROBERT BÜHL.